US008210225B2

(12) United States Patent
Weber

(10) Patent No.: US 8,210,225 B2
(45) Date of Patent: Jul. 3, 2012

(54) BLANKET FOR USE IN A COLD-FOIL STAMPING PROCESS AND COLD-FOIL STAMPING DEVICE HAVING A BLANKET

(75) Inventor: Alexander Weber, Weinheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 480 days.

(21) Appl. No.: 12/114,170

(22) Filed: May 2, 2008

(65) Prior Publication Data

US 2008/0277067 A1 Nov. 13, 2008

(30) Foreign Application Priority Data

May 9, 2007 (DE) ......................... 10 2007 022 258

(51) Int. Cl.
*B32B 37/00* (2006.01)

(52) U.S. Cl. ....................................... 156/538; 156/555

(58) Field of Classification Search .................. 156/538, 156/555, 582; 101/36, 141, 142; 442/223, 442/225

See application file for complete search history.

(56) References Cited

U.S. PATENT DOCUMENTS

| | | | | |
|---|---|---|---|---|
| 1,778,185 | A * | 10/1930 | De Vries | 428/494 |
| 5,352,507 | A * | 10/1994 | Bresson et al. | 428/35.9 |
| 5,565,054 | A | 10/1996 | Lappe et al. | |
| 2004/0184757 | A1 * | 9/2004 | Miyoshi et al. | 385/143 |
| 2009/0301649 | A1 * | 12/2009 | Augsberg et al. | 156/237 |

FOREIGN PATENT DOCUMENTS

| | | | |
|---|---|---|---|
| DE | 10 2005 046 689 | A1 | 4/2007 |
| EP | 0 578 706 | B1 | 1/1994 |

* cited by examiner

*Primary Examiner* — James Sells

(74) *Attorney, Agent, or Firm* — Laurence A. Greenberg; Werner H. Stemer; Ralph E. Locher

(57) ABSTRACT

A blanket for use in a cold-foil stamping process includes hard elements at least partially embedded in a cover layer. As a result, a line pressure in a transfer nip of a transfer unit of a cold-foil stamping device can be adjusted and increased to such an extent that a transfer layer is transferred with sharper edges from a transfer foil to a printing substrate. Structuring of the transfer layer due to the hard elements can be successfully avoided at the same time, if desired, by completely embedding the hard elements into the cover layer. A cold-foil stamping device including a transfer cylinder and a corresponding blanket, is also provided.

8 Claims, 4 Drawing Sheets

BLANKET FOR USE IN A COLD-FOIL STAMPING PROCESS AND COLD-FOIL STAMPING DEVICE HAVING A BLANKET

CROSS-REFERENCE TO RELATED APPLICATION

This application claims the priority, under 35 U.S.C. §119, of German application DE 10 2007 022 258.2, filed May 9, 2007; the prior application is herewith incorporated by reference in its entirety.

BACKGROUND OF THE INVENTION

Field of the Invention

The present invention relates to a blanket for use in a cold-foil stamping or embossing process, including a layer of high tensile strength that faces a transfer cylinder, at least one intermediate layer, and a cover layer. Moreover, the invention relates to a printing machine or cold-foil stamping device including at least one transfer unit for transferring a transfer layer of a carrier foil to a printing substrate, the transfer unit including a transfer cylinder and an impression cylinder, the transfer cylinder engaging with the impression cylinder and forming a nip with the latter through which the printing substrate is transported along a transport path for the purpose of transferring the transfer layer. The printing machine further includes at least one application unit for applying an adhesive at least to areas of the printing substrate. The application unit is disposed upstream of the transfer unit and the transfer layer is removed from the carrier foil in the transfer unit in those areas of the printing substrate that are coated with adhesive.

Preferably, the device relates to a process known as cold-foil stamping.

In accordance with the cold-foil stamping process, a transfer layer is transferred from a carrier material to a printing substrate.

The carrier material is a carrier foil to which a layer of varnish has been applied. The layer of varnish is in particular responsible for the color of the transfer layer. The layer of varnish is connected to an aluminum layer that creates a metallic shine of the transfer layer. In addition, a further adhesion layer may be provided on the aluminum layer to improve the adhesive properties of the transfer layer in connection with the adhesive on the printing substrate. The layers that are transferred from the carrier material are referred to as the transfer layer.

In order to transfer the transfer layer to a printing substrate, the transfer foil is fed through a transfer nip together with the printing substrate. The transfer nip is formed by a transfer cylinder and an impression cylinder that are in contact with each other. As the transfer cylinder and the impression cylinder rotate, they are engaged with each other at a certain pressure that is sufficient to achieve a transfer of the transfer layer onto the printing substrate in the nip.

In order to ensure that the transfer layer is transferred to defined areas on the printing substrate, an adhesive layer is applied to the printing substrate before the foil is transferred. The adhesive layer is applied to those areas in which the foil will be transferred.

The adhesive may be a colorless adhesive, an adhesive with a defined color, or an adhesive that has been dyed to match the color of the foil. It is known from bronzing, for the purpose of transferring metal particles, to use a particularly tacky type of ink having a color which matches the color of the desired metal coating. In that respect, it is likewise possible to use a tacky type of ink instead of a dyed adhesive.

The transfer layer may basically be a metal layer or a different type of layer. It may, for example, be an aluminum layer that is applied to a yellow/golden layer of varnish or on a silver layer of varnish as desired.

Furthermore, the transfer layer may be a colorless layer, for example being formed of a PE foil, which is transferred to the printing substrate to form a protective layer thereon.

The use of a conductive layer as the transfer layer is possible too. Thus, electrically and/or thermally conductive areas can be transferred to the printing substrate. Even the transfer of previously prepared, defined areas of a layer as the transfer layer is possible. Such a defined area of a layer may be RFID chips or the antennae thereof. Suitable ceramics may be transferred too. In that manner, it is even conceivable to transfer superconductive structures onto a printing substrate.

A device for cold-foil stamping is disclosed in European Patent EP 0 578 706 B1, corresponding to U.S. Pat. Nos. 5,565,054 and 5,735,994.

In accordance with that document, the cold-foil stamping operation is carried out in a multicolor printing press. The printing substrate, which may be a sheet of paper, cardboard, or a web of paper, is transported along a predefined transport path in the printing press.

In a first printing unit of the printing press, an adhesive rather than ink is transferred to the printing substrate. That printing unit includes a printing plate which has been imaged in accordance with the regions that are to transfer the adhesive. The adhesive is transferred to the printing substrate just like conventional offset printing ink. A printing unit that applies the adhesive will also be referred to herein as an application unit.

Then the printing substrate is transported into a second printing unit. In that second printing unit, the impression cylinder and the blanket cylinder are constructed as a transfer unit.

A foil module including a transfer foil supply reel and a transfer foil wind-up reel are provided in the region of the second printing unit. Intermediate rollers of a foil-guiding device guide the foil in the shape of a web of transfer foil from the transfer foil supply reel to the transfer nip and on to the transfer foil wind-up reel.

In order to transfer the transfer layer to the printing substrate, the web of transfer foil and the printing substrate that has been coated with the adhesive in certain areas are fed through the transfer nip together in such a way that the transfer layer lies on the adhesive layer. The transfer layer is then transferred to the printing substrate by pressure. Due to the adhesive, the transfer layer is cleanly removed from the transfer foil.

In order to achieve a clean transfer of the transfer layer onto the printing substrate, the foil and the printing substrate are driven at the same speed in the region of the transfer nip during transfer.

In a following pressure unit, the transferred transfer layer is acted upon to ensure that the application of the foil is permanent.

The document proposes to use a conventional printing blanket, i.e. a rubber blanket as it is commonly used in a printing press, as the blanket on the transfer cylinder.

SUMMARY OF THE INVENTION

It is accordingly an object of the invention to provide a blanket for use in a cold-foil stamping process and a cold-foil stamping device having a blanket, which overcome the hereinafore-mentioned disadvantages of the heretofore-known devices of this general type and which improve the quality of a printed product that is created in a cold-foil stamping device.

With the foregoing and other objects in view there is provided, in accordance with the invention, a blanket for a cold-foil stamping process. The blanket comprises a layer having high tensile strength for facing a transfer cylinder, at least one intermediate layer, a cover layer, and hard elements included and embedded in the cover layer.

With the objects of the invention in view, there is also provided a cold-foil stamping device, comprising an application unit for applying an adhesive layer corresponding to an image to be stamped, a transfer unit including a transfer cylinder and an impression cylinder together forming a transfer nip, a transfer foil guided through the transfer nip together with a printing substrate for transferring a transfer layer under pressure to regions of the printing substrate carrying adhesive, and a blanket according to the invention mounted to the transfer cylinder to effect a transfer of the transfer layer in the transfer nip.

It has been found that a subsequent pressure unit is not necessary for the transferred transfer layer to have a high quality because the actual transfer of the foil is substantially determined by the quality of the adhesive and the conditions in the transfer unit.

It has been found that an improved foil transfer, for example a transfer with sharp edges, of the transfer layer to the printing substrate, occurs when there is sufficient pressure in the transfer unit, i.e. in the transfer nip.

Such an increased pressure can be achieved by using a blanket in accordance with the invention on the blanket cylinder.

The blanket is used on the transfer cylinder of a cold-foil stamping unit. The transfer cylinder is a blanket cylinder of a conventional printing unit. The transfer cylinder is engaged with an impression cylinder and forms a transfer nip with the latter.

The blanket has a cover layer, at least one intermediate layer underneath the cover layer, and a lower layer of high tensile strength that faces the cylinder and is preferably made of a fabric or metal layer.

In accordance with another feature of the invention, the intermediate layer may be compressible or incompressible and may have open pores or closed pores.

The printing blanket according to the invention includes a cover layer with hard elements, preferably elements formed therein that are hardly compressible or not compressible at all and/or hardly flexible or not flexible at all.

These elements may be embedded or ingrained in the cover layer. In accordance with a further feature of the invention, the cover layer may include a conventional rubber or silicone layer into which the hard elements have been integrated.

Moreover, the cover layer may be constructed to have a smooth low-friction surface. For this purpose, the smooth surface may be lapped, cast coated, blasted, or textured to further reduce friction.

The smooth surface ensures reliable release of the transfer foil from the transfer cylinder. Moreover, at the same time, the embedded hard elements can be prevented from stamping structures into the transfer layer, i.e. from making an impression in the transfer layer.

In accordance with an added feature of the invention, the hard elements may, in particular, be spherical or dome-shaped elements such as glass, plastic, ceramic, or metal balls.

In accordance with an additional feature of the invention, alternatively, fabrics in the shape of glass, metal, carbon, plastic, or ceramic fibers may be introduced into the cover layer as the hard elements.

The hard elements may have alternative geometric shapes, for example they may be roller-shaped, cylindrical, cubic, pyramidal, or have similar structures.

In accordance with yet another feature of the invention, the hard elements may preferably be completely enclosed by the cover layer. In a further embodiment, the cover layer may have an area of up to 0.5 mm around which the hard elements are introduced and embedded in the cover layer. In this embodiment, the hard elements are incorporated up to 0.5 mm under the surface of the cover layer.

In accordance with yet a further feature of the invention, alternatively, the cover layer may cover the hard elements to such an extent that no structures are present on the surface of the cover layer as a result of the embedded hard elements. In accordance with a further feature of the invention, no structures are to be present on the surface of the cover layer when the blanket is mounted on the cylinder.

The cover layer of the blanket may be created in a process in which the hard elements are embedded or molded into the cover layer.

In accordance with the invention, the blanket is used in what is known as a cold-foil stamping process as described, for example, in German Published, Non-Prosecuted Patent Application DE 10 2005 046 689 A1, which is incorporated by reference in its entirety herein as a description of cold-foil stamping and of a corresponding device. The blanket is mounted to the transfer cylinder as described above. The transfer cylinder and the impression cylinder form the transfer nip. A web of transfer foil and a printing substrate carrying an adhesive are fed through the transfer nip together. Pressure is applied to transfer the transfer layer from the transfer foil to the printing substrate in the transfer nip. Thus, the transfer layer is transferred to those areas that carry the adhesive as defined by the image to be stamped or embossed.

The use of the blanket according to the invention advantageously ensures that elements, i.e. regions of the transfer layer, are transferred to the printing substrate with sharp edges as a result of the hard cover layer obtained by the embedded or integrated hard elements. If the surface is additionally smooth, in connection with the incorporated hard elements, a particularly glossy or shiny surface layer of the transferred transfer layer can be achieved, i.e. a transfer result that has a high degree of glossiness and sharp edges.

The embodiments that have been known heretofore, which include conventional blankets on the transfer cylinder or glass-bead blankets to reduce friction between the transfer cylinder and the foil, cannot achieve increased glossiness and a foil transfer with sharp edges. Moreover, the smooth surface further ensures reduced friction between the blanket and the foil.

In accordance with a concomitant feature of the invention, if hard elements in the form of a fabric are used, it may be advantageous to only partly embed the hard elements in the cover layer. In this case, at least individual areas of the fabric project from the cover layer and can thus further increase the line pressure between the transfer cylinder and the impression cylinder in order to enhance the transfer quality of the transfer layer even further. Advantageously, the fabric may project from the cover layer to such an extent that the transfer layer that has been transferred receives a structured surface, for example a linen-type structure.

Other features which are considered as characteristic for the invention are set forth in the appended claims.

Although the invention is illustrated and described herein as embodied in a blanket for use in a cold-foil stamping process and a cold-foil stamping device having a blanket, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
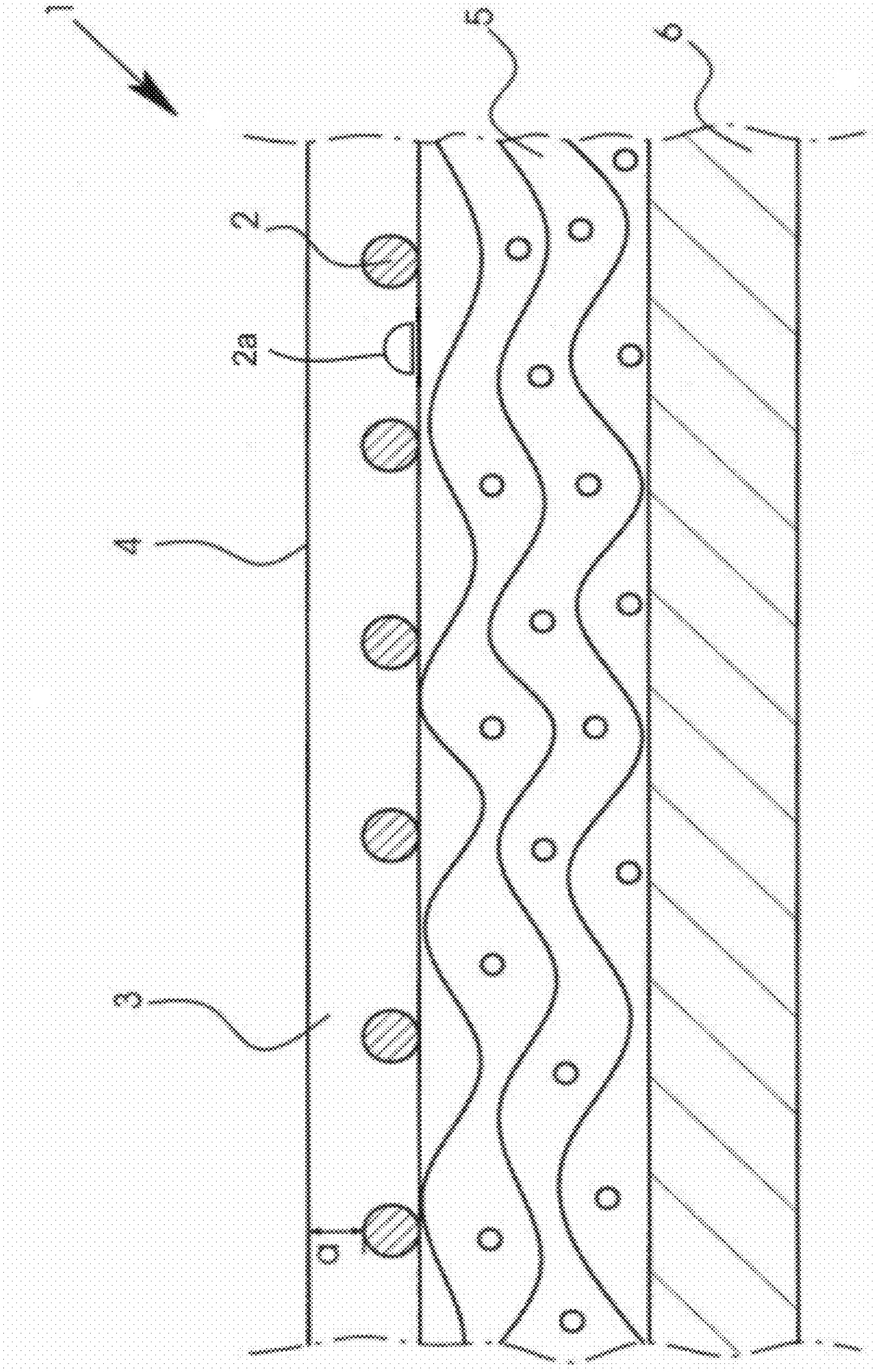
FIG. 1 is a fragmentary, diagrammatic, sectional view of a blanket with spherical hard elements.

Referring now to the figures of the drawings in detail and first, particularly, to FIG. 1 thereof, there is seen a blanket 1 with embedded glass beads 2, 2*a* which are spherical or dome-shaped. The glass beads 2 are embedded in a cover layer 3 in such a way that they are spaced apart from a surface 4 of the blanket by a distance a.

In this case, a compressible intermediate layer 5 is provided underneath the cover layer 3. Alternatively, the intermediate layer 5 may be an incompressible layer.

Figure 4:
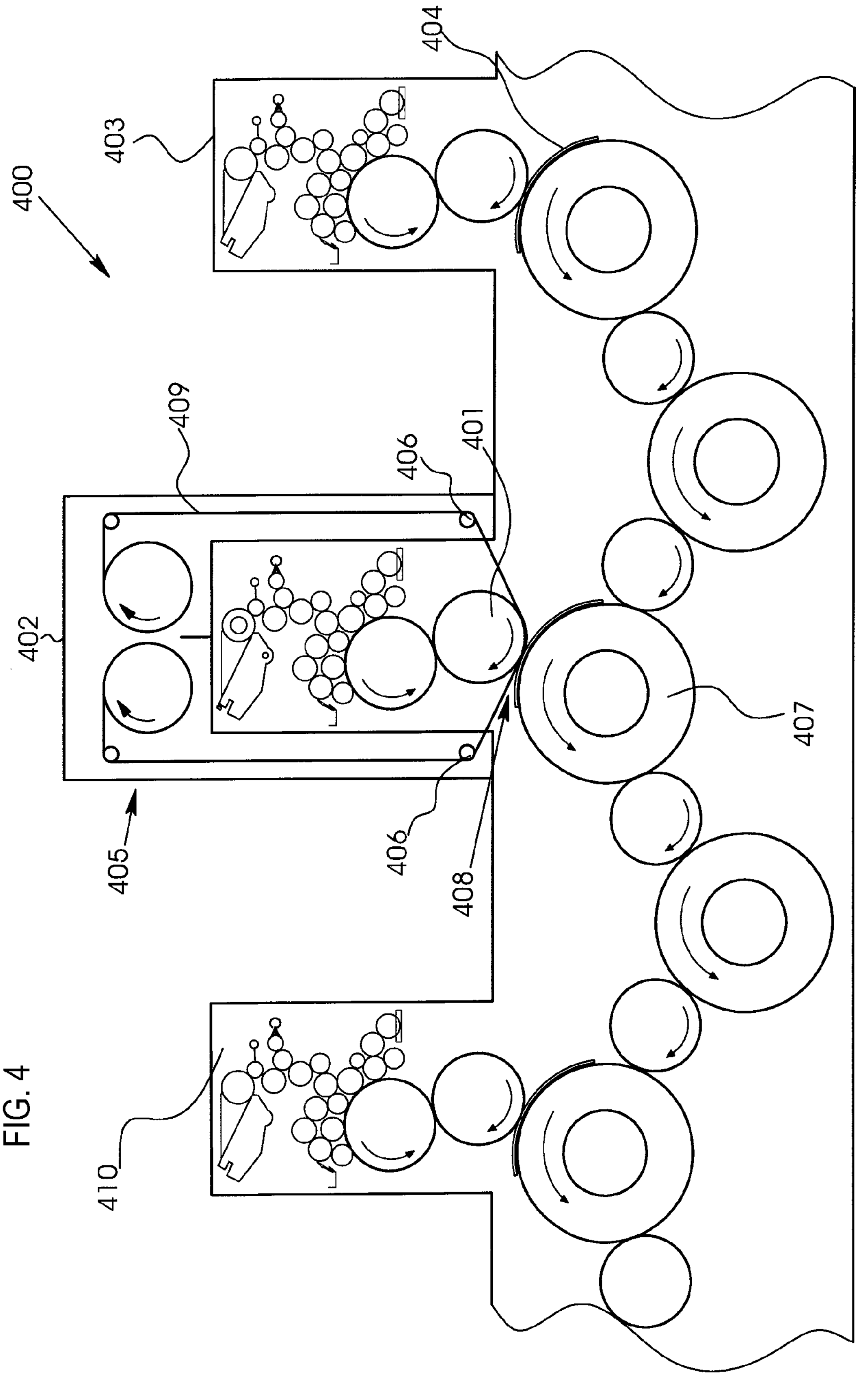
FIG. 4 is a fragmentary, longitudinal-sectional view of a cold-foil stamping device for using the blanket.

Disposed underneath the intermediate layer 5 is a layer 6 of high tensile strength, which is a blanket layer that rests against a transfer cylinder 401 seen in FIG. 4.

Figure 2:
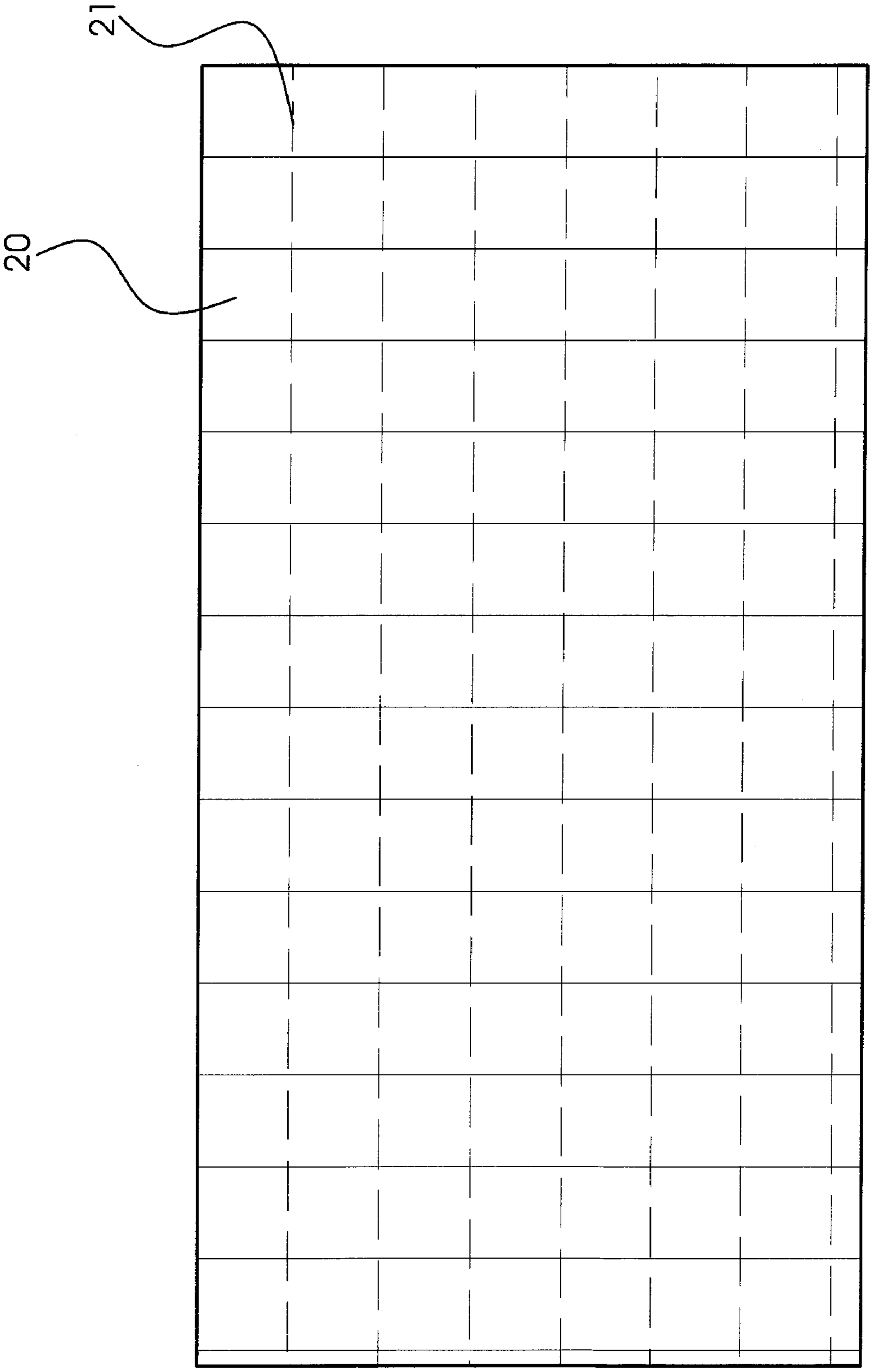
FIG. 2 is an elevational view of a blanket with embedded fabric.

FIG. 2 illustrates an alternative embodiment of a blanket 20. A fabric in the form of a glass fiber fabric 21 is provided instead of glass beads 2. This glass fiber fabric 21 was introduced into a cover layer 3 of the blanket 20 in a manner analogous to the introduction of the glass beads 2 in the example illustrated in FIG. 1.

Although the glass beads 2 are shown herein as lying directly on the intermediate layer 5, the glass beads 2 may likewise be completely surrounded by the cover layer 3 and may still be at a distance a from the surface 4 of the blanket 1. The same applies to individual fibers of the glass fiber fabric 21 illustrated in FIG. 2.

In the examples shown herein, rubber is the preferred material for the cover layer 3. Silicone can be used equally well.

Figure 3:
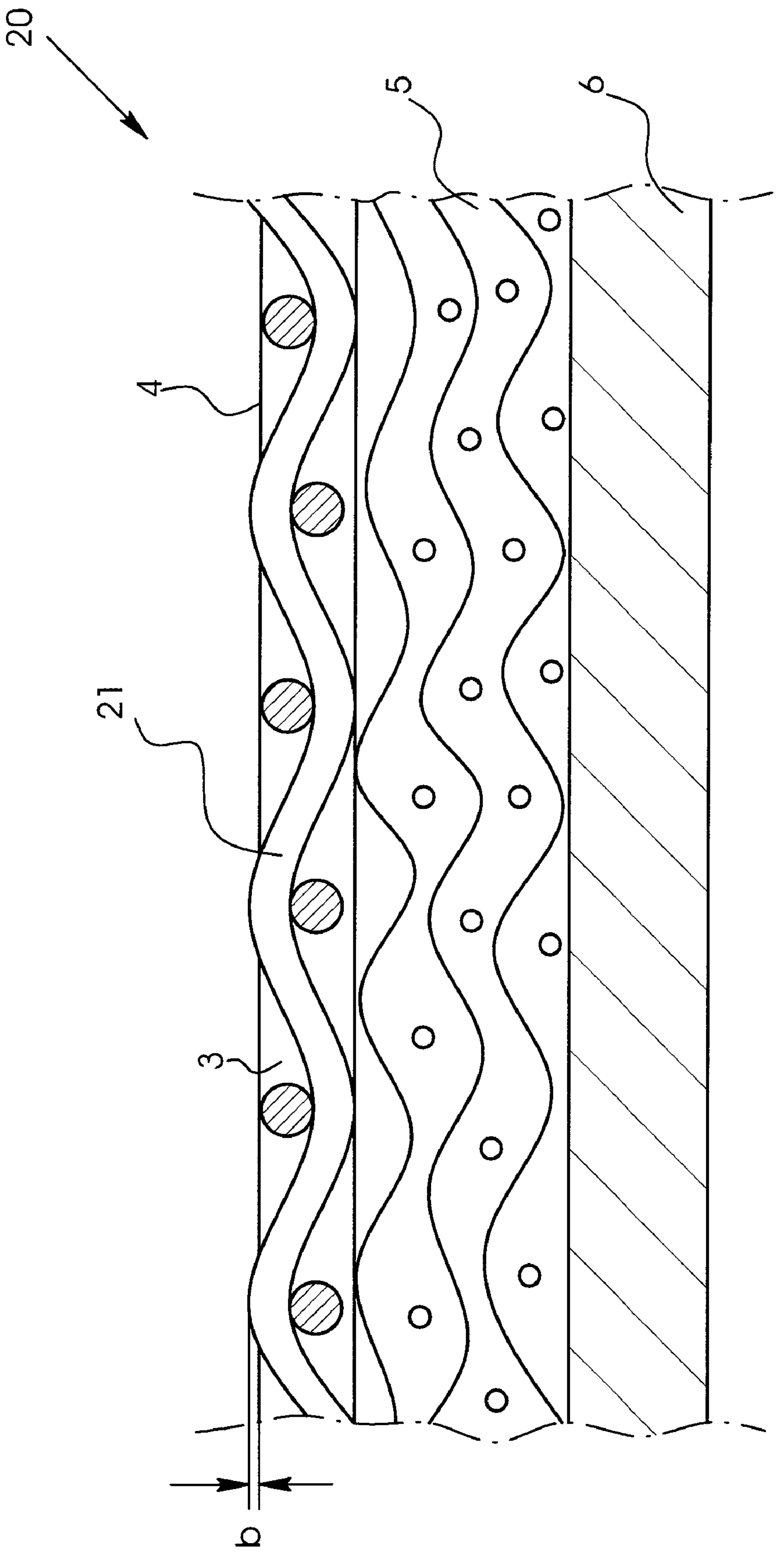
FIG. 3 is a sectional view of a blanket with projecting fabric.

FIG. 3 illustrates a further embodiment of the blanket 20. The glass fiber fabric 21 is not completely embedded in the cover layer 3, which means that individual fibers of the glass fiber fabric 21 project from the surface 4 of the blanket 20 by a distance b. Otherwise, identical elements are designated by the same reference numerals as in the other figures.

FIG. 4 illustrates an example of a cold-foil stamping device 400, in which a blanket 1, 20 according to the invention is mounted on a transfer cylinder 401.

An adhesive layer is transferred to areas of a sheet 404 in an application unit 403 provided upstream of a transfer unit 402. The application unit 403 corresponds to a conventional printing unit that transfers an adhesive instead of ink.

The transfer unit 402 may also be a conventional printing or varnishing unit that has been equipped with a transfer module 405. Guides 406 guide a transfer foil 409 through a transfer nip 408 formed by the transfer cylinder 401 and an impression cylinder 407. The transfer foil 409 is fed through the transfer nip 408 together with the sheet 404. In the nip 408, a non-illustrated transfer layer is transferred under pressure from the transfer foil 409 to areas on the sheet 404 that carry the adhesive and correspond to an image to be stamped.

After the foil has been transferred in the transfer unit 402, the sheet may be transported through further processing units, such as an illustrated printing unit 410. The application unit 403 may be preceded by other processing units that are not illustrated herein.

The use of a blanket 1, 20 according to the invention mounted on the transfer cylinder 401 ensures that the transfer layer is transferred with particularly sharp edges and that the glossiness of the printed product is enhanced due to the increased pressure in the transfer nip 408 as a result of the hard elements 2, 21. Since the surface 4 of the blanket 1 is nevertheless smooth, a structuring of the transfer layer can be avoided if desired. If a structuring or stamping in this manner is desired, the desired structure can be created by the projecting fabric 21. The spacing between the individual fibers and their configuration may be chosen to match the desired structure.

As an alternative to the configurations of glass beads 2 and fabric 21 as illustrated herein, the glass beads 2 may be evenly or unevenly distributed and/or may have the same size or varying sizes. The fibers of the fabric 21 may have varying thickness and/or may be evenly or unevenly distributed in the cover layer 3 of the blanket 20.

The invention claimed is:

1. A blanket for a cold-foil stamping process, the blanket comprising:

a blanket surface;

a tension layer for facing a transfer cylinder;

at least one intermediate layer;

a cover layer being distinct from said tension layer and said intermediate layer; and elements being at least one of substantially incompressible or inflexible, said elements being included and embedded in and entirely surrounded by said cover layer and disposed at a distance from said blanket surface, said elements being in the form of a fabric or in the form of at least one of spherical or dome-shaped elements made of a material selected from the group consisting of glass, ceramic, plastic, carbon and metal; and said cover layer with said elements being configured for increasing a line pressure between the transfer cylinder and an impression cylinder.

2. The blanket according to claim 1, wherein said fabric is made of a fiber selected from the group consisting of glass fiber, carbon fiber, ceramic fiber, metal and carbon fiber.

3. The blanket according to claim 1, wherein said distance is approximately 0.5 mm.

4. The blanket according to claim 1, wherein at least parts of said fabric are not completely surrounded by said cover layer and at least parts of said fabric project from said cover layer by a distance.

5. The blanket according to claim 2, wherein at least parts of said fabric are not completely surrounded by said cover layer and at least parts of said fabric project from said cover layer by a distance.

6. A cold-foil stamping device, comprising:

an application unit for applying an adhesive layer corresponding to an image to be stamped;

a transfer unit including a transfer cylinder and an impression cylinder together forming a transfer nip;

a transfer foil guided through said transfer nip together with a printing substrate for transferring a transfer layer under pressure to regions of the printing substrate carrying adhesive; and a blanket according to claim 1 mounted to said transfer cylinder to effect a transfer of the transfer layer in said transfer nip.

7. The blanket according to claim 1, wherein said blanket surface is smooth.

8. The blanket according to claim 6, wherein said blanket surface is smooth.

* * * * *